D. W. SHIEK.
COMPUTING MACHINE OR THE LIKE.
APPLICATION FILED OCT. 20, 1910.
1,149,472.
Patented Aug. 10, 1915.
12 SHEETS—SHEET 4.
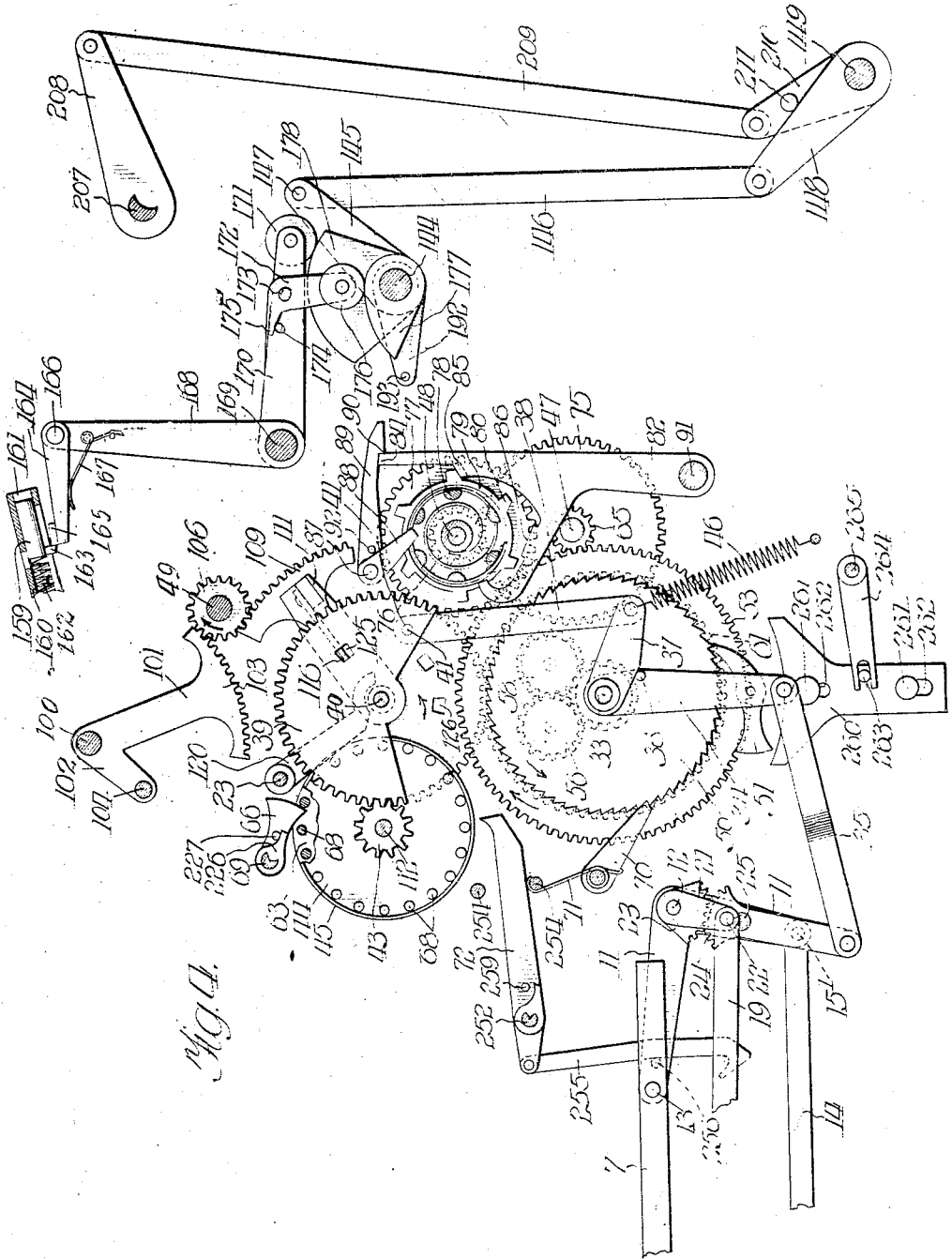
Witnesses:
Robert N. Weir
Charles I. Cobb
Inventor:
Daniel W. Shiek
By Hill & Hill
Attys.

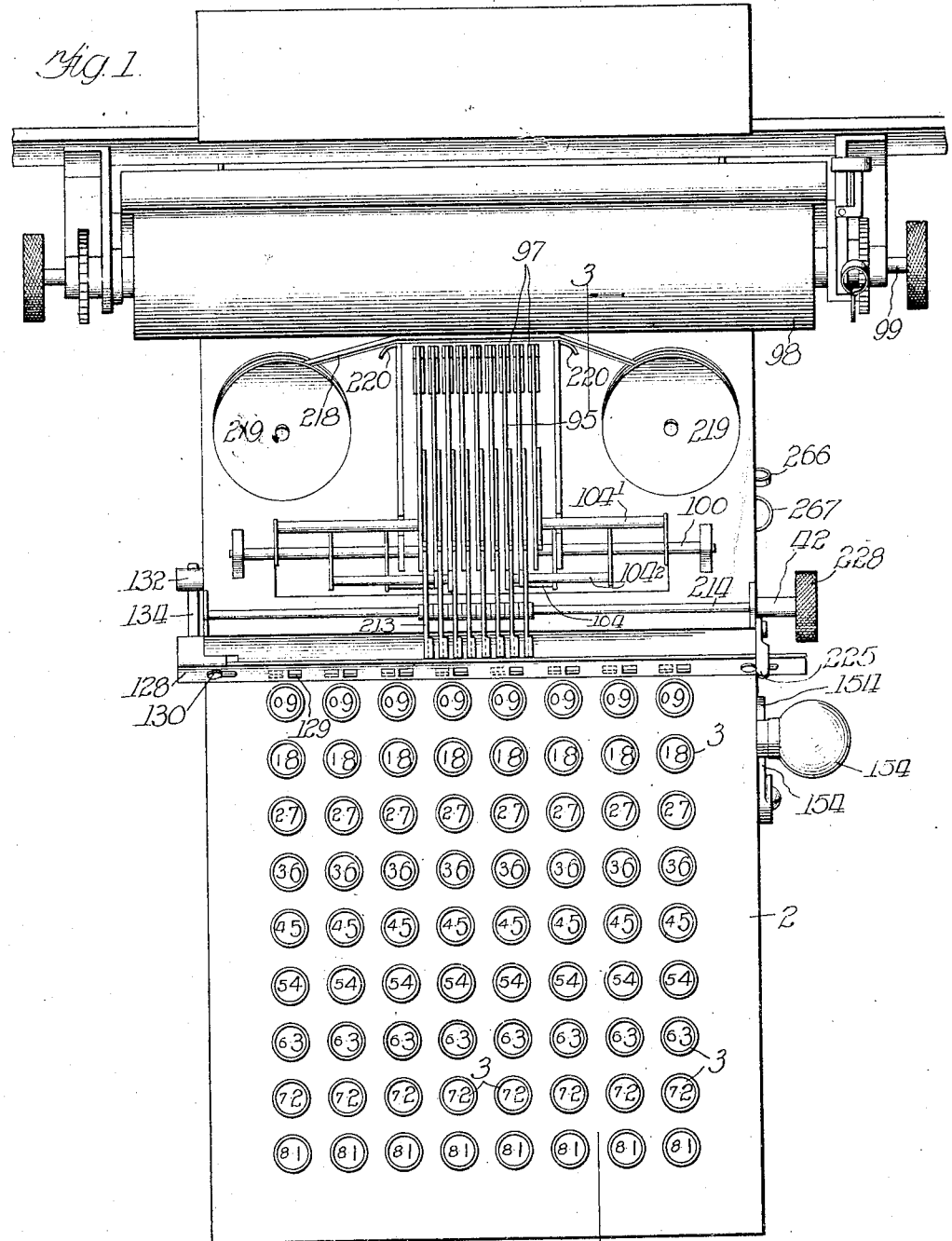

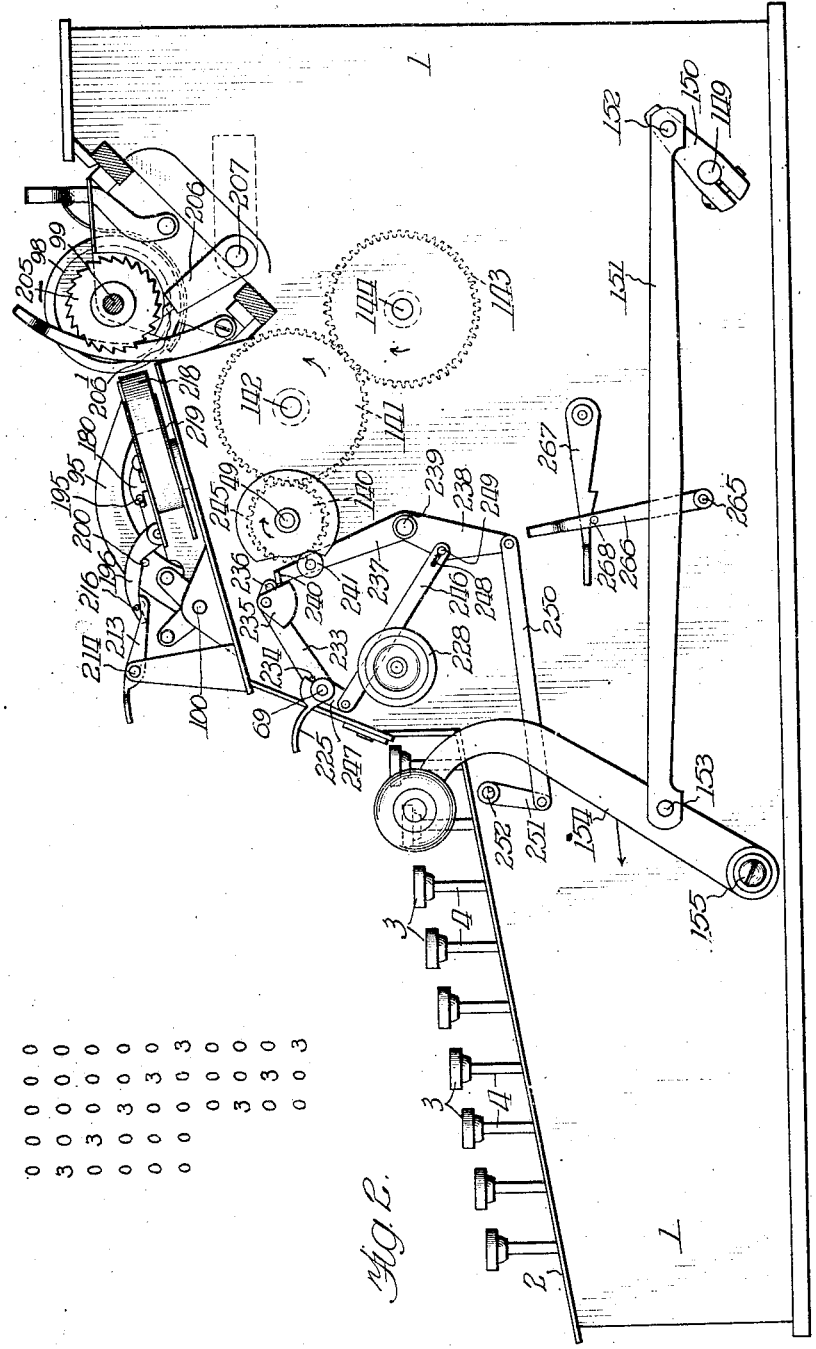

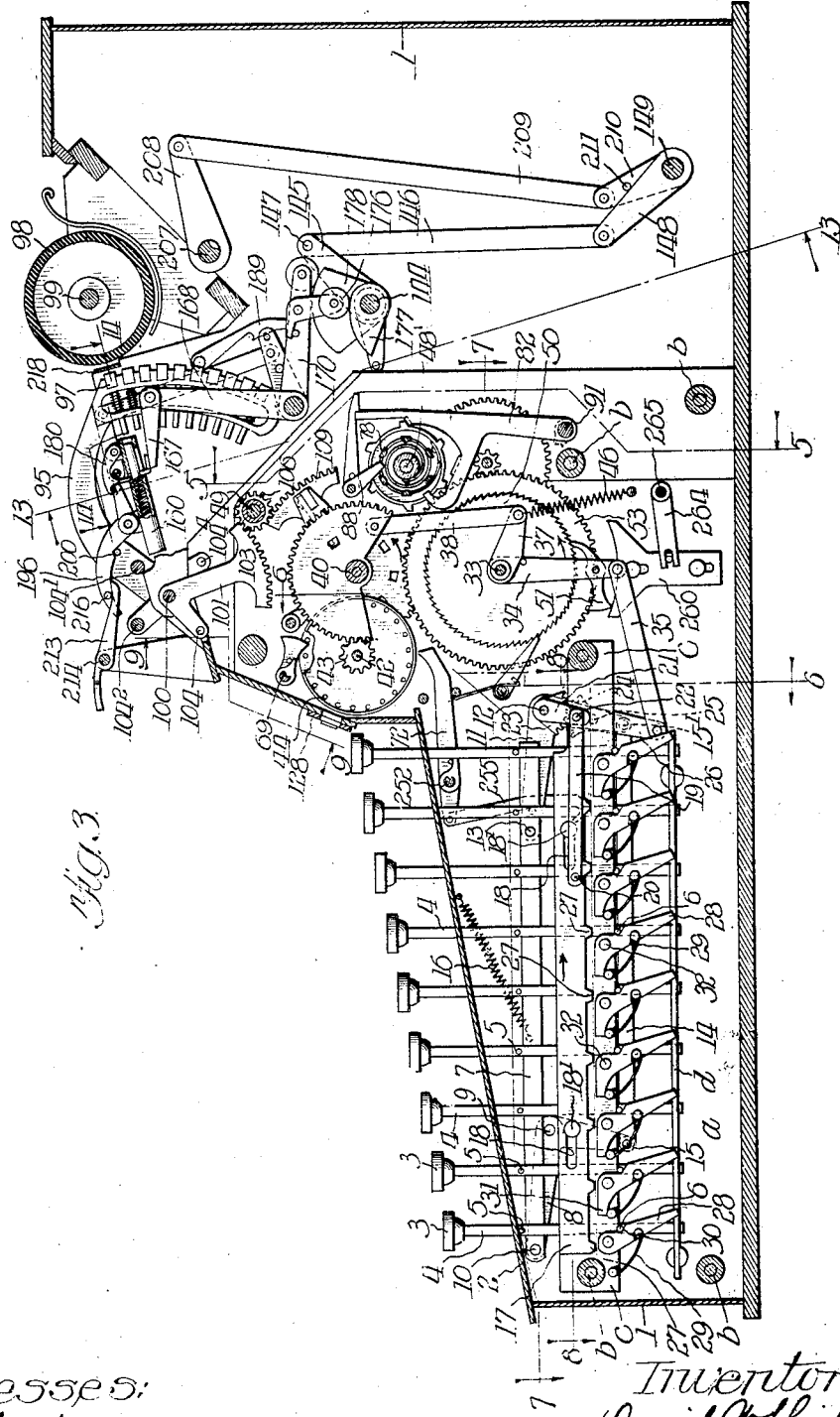

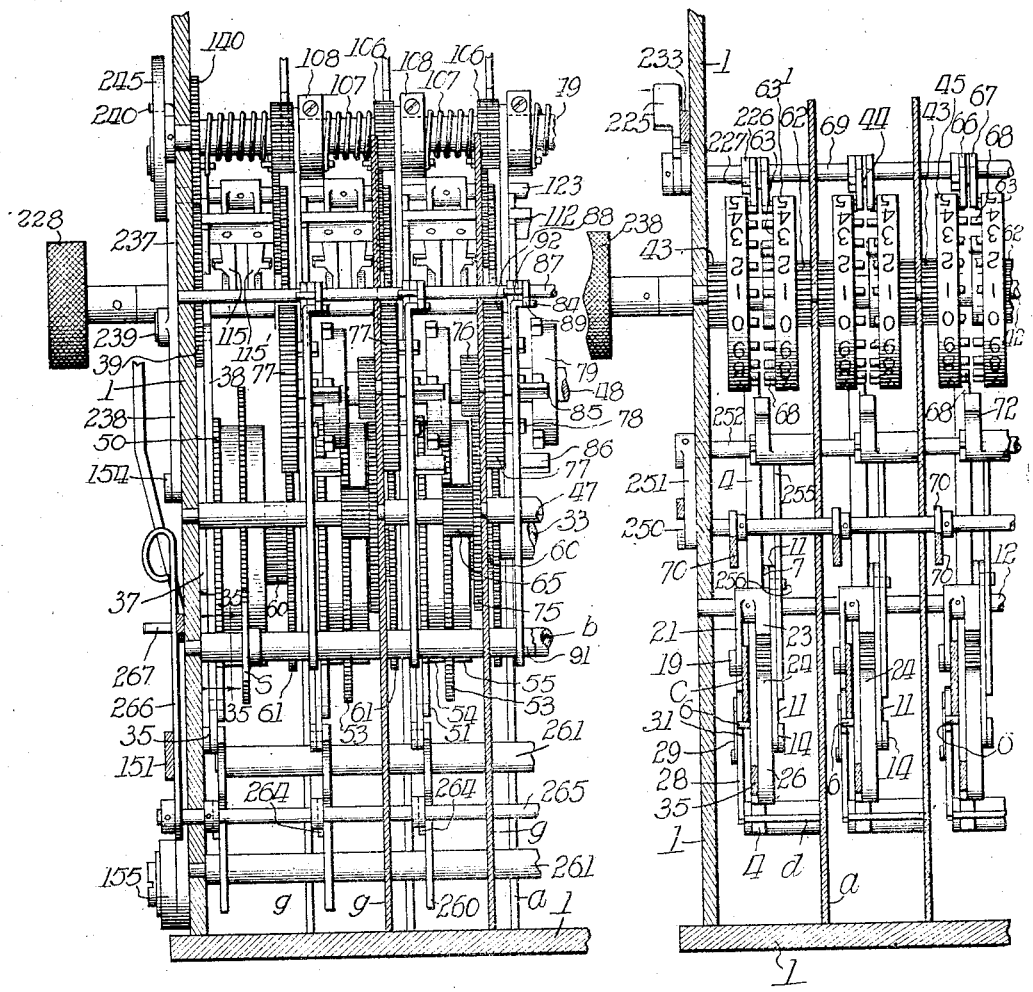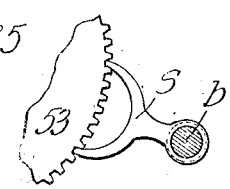

D. W. SHIEK.
COMPUTING MACHINE OR THE LIKE.
APPLICATION FILED OCT. 20, 1910.
1,149,472.
Patented Aug. 10, 1915.
12 SHEETS—SHEET 6.
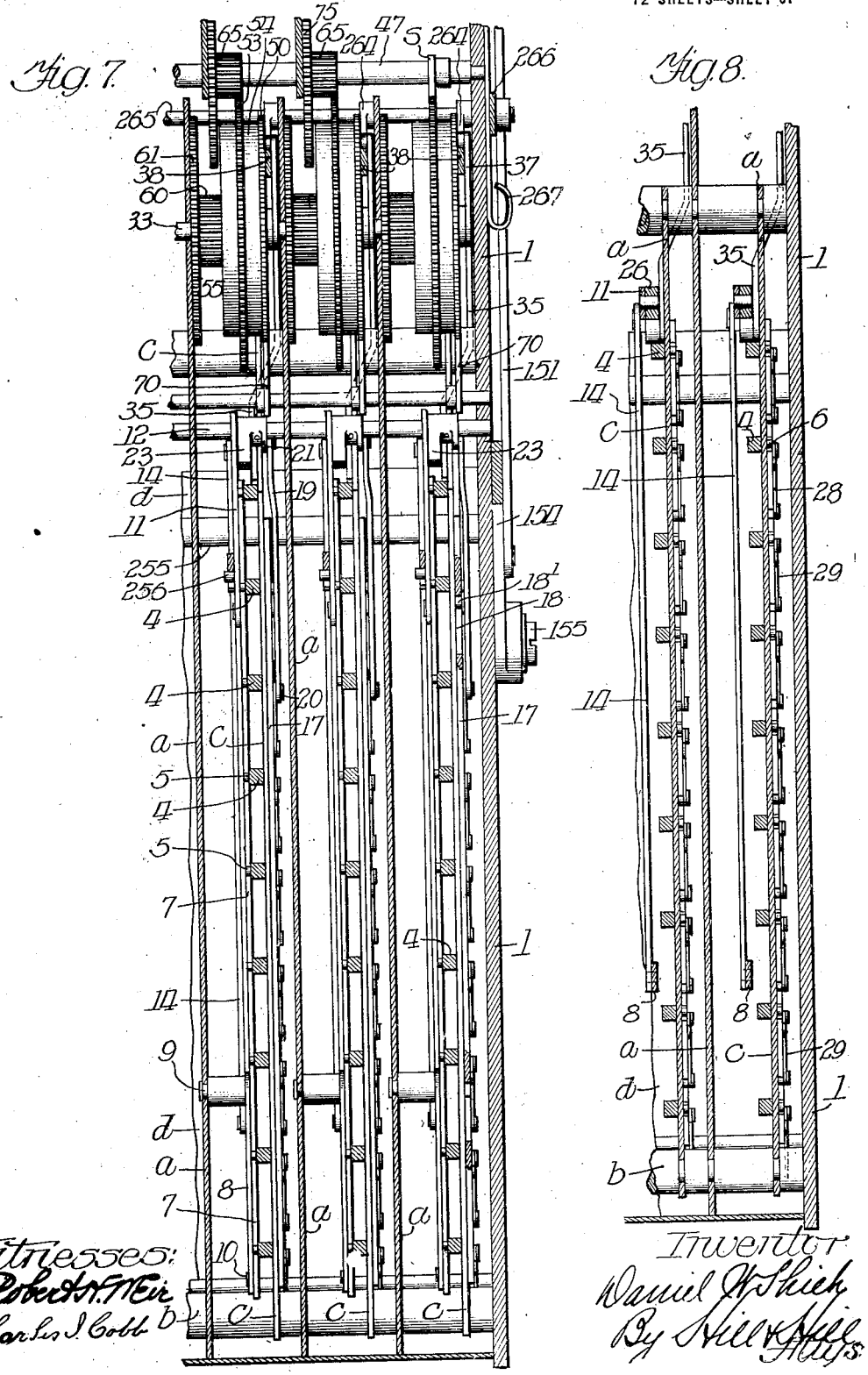

D. W. SHIEK.
COMPUTING MACHINE OR THE LIKE.
APPLICATION FILED OCT. 20, 1910.
1,149,472.  Patented Aug. 10, 1915.
12 SHEETS—SHEET 7.
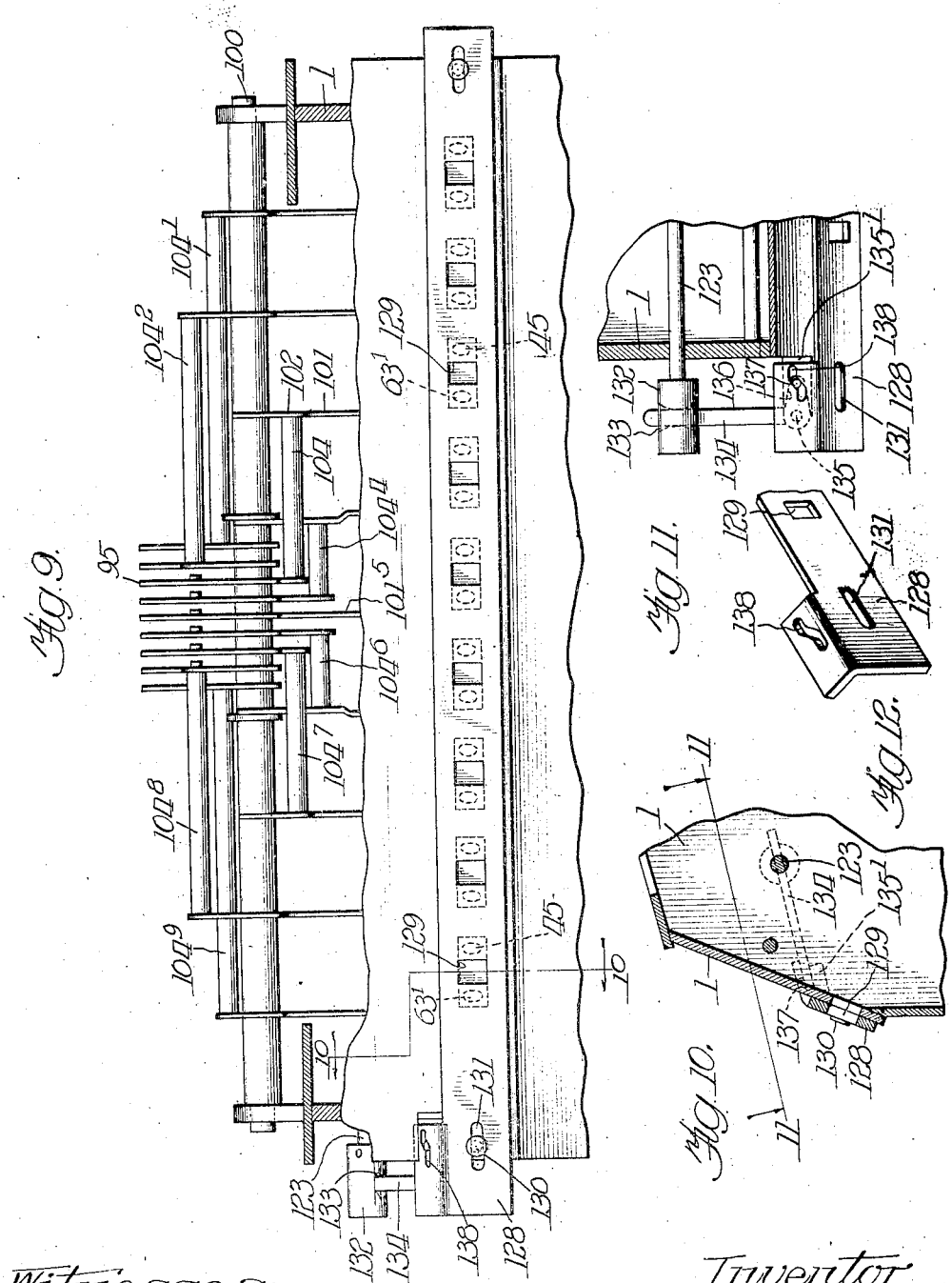

D. W. SHIEK.
COMPUTING MACHINE OR THE LIKE.
APPLICATION FILED OCT. 20, 1910.

1,149,472. Patented Aug. 10, 1915.
12 SHEETS—SHEET 8.

Witnesses:
Robert N. Weir
Charles I. Cobb

Inventor:
Daniel W. Shiek
By Hill & Hill
Attys.

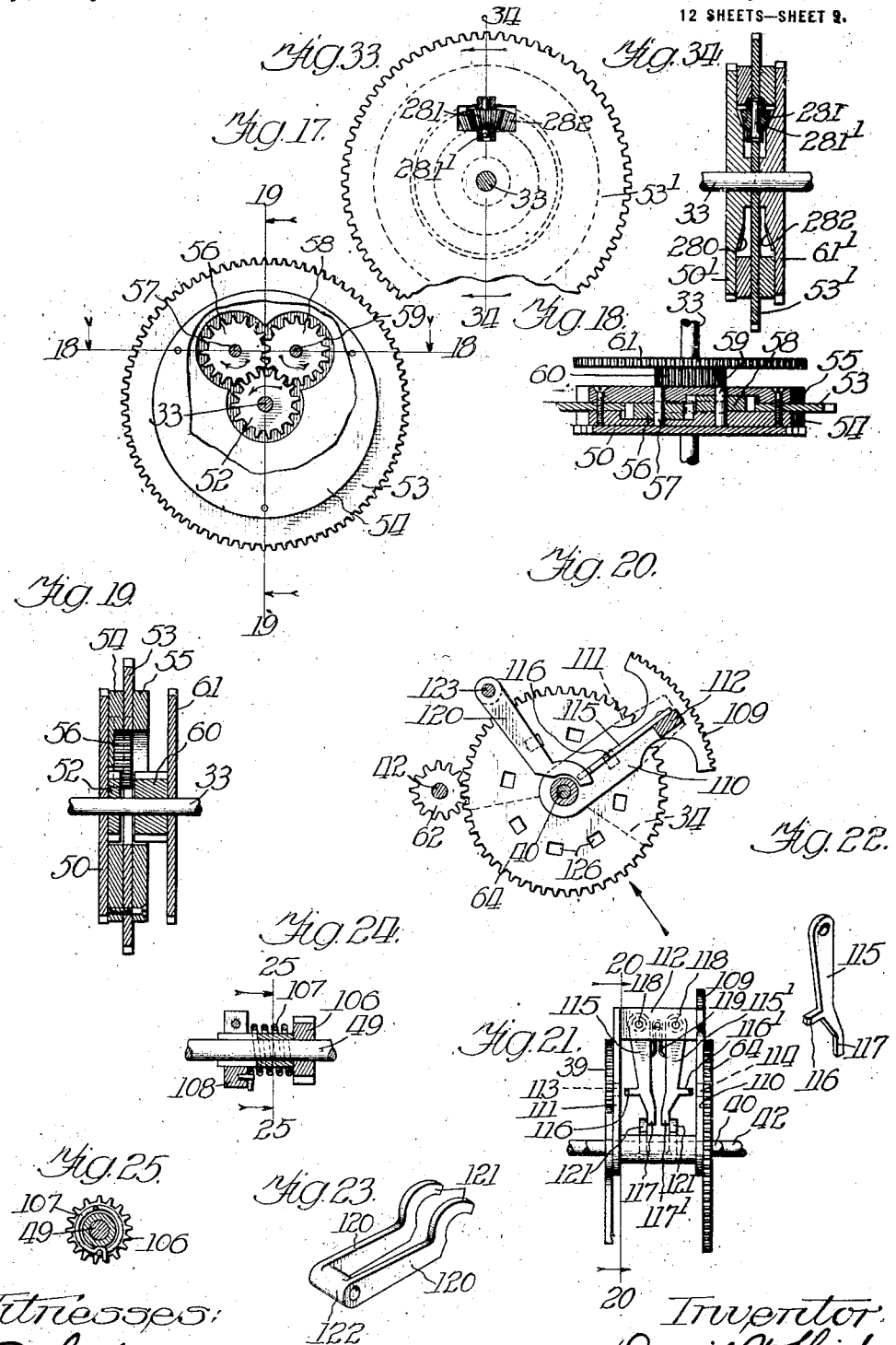

D. W. SHIEK.
COMPUTING MACHINE OR THE LIKE.
APPLICATION FILED OCT. 20, 1910.
1,149,472.
Patented Aug. 10, 1915.
12 SHEETS—SHEET 10.
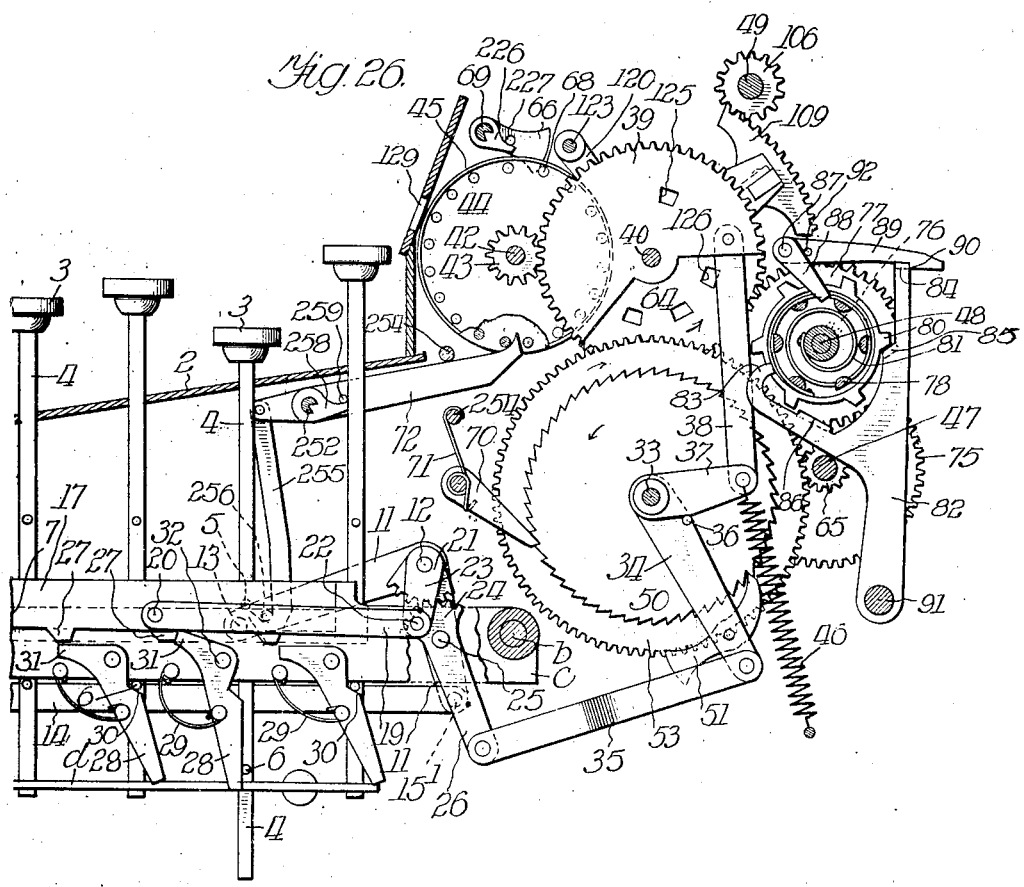
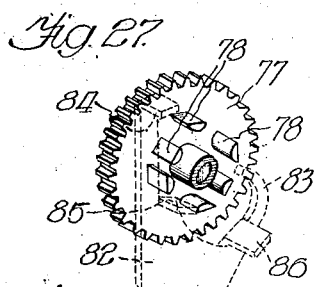
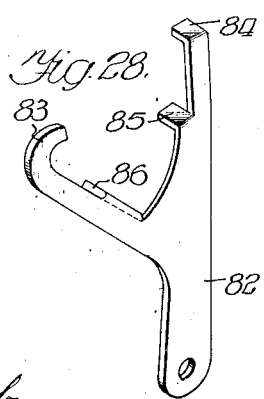
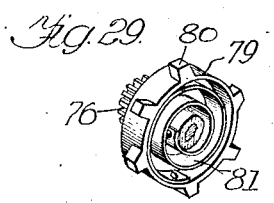
Witnesses:
Robert N. Weir
Charles J. Cobb
Inventor:
Daniel W. Shiek
By Hill & Hill
Attys.

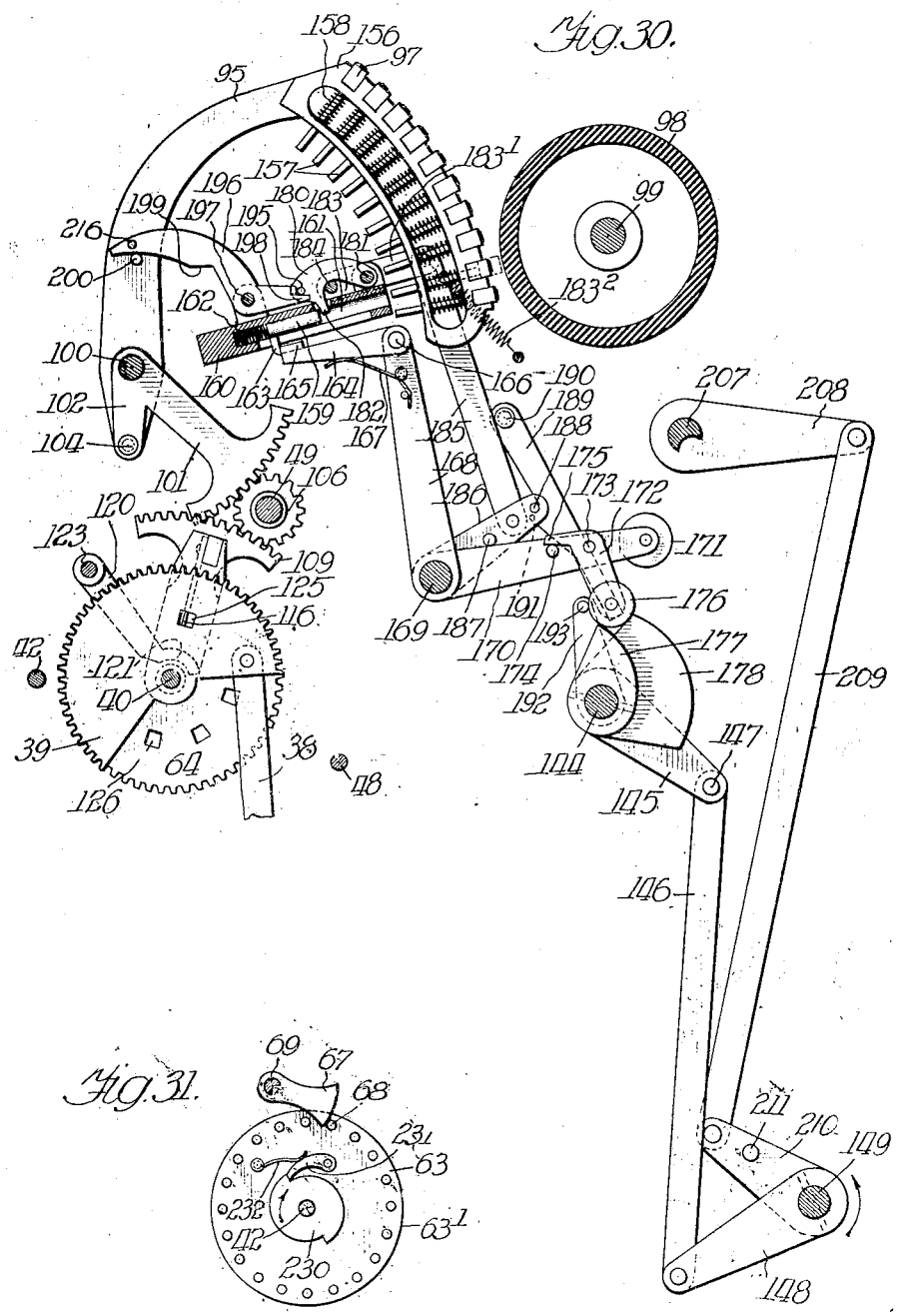

D. W. SHIEK.
COMPUTING MACHINE OR THE LIKE.
APPLICATION FILED OCT. 20, 1910.

1,149,472.

Patented Aug. 10, 1915.
12 SHEETS—SHEET 12.

Witnesses:
Robert N. Weir
Charles J. Cobb

Inventor
Daniel W. Shiek
by Hill & Kee
Attys.

UNITED STATES PATENT OFFICE.

DANIEL W. SHIEK, OF INDIANAPOLIS, INDIANA, ASSIGNOR TO WALTER L. MILLIKEN, OF BARNSTABLE, MASSACHUSETTS.

COMPUTING-MACHINE OR THE LIKE.

1,149,472.      Specification of Letters Patent.      Patented Aug. 10, 1915.

Application filed October 20, 1910. Serial No. 588,231.

*To all whom it may concern:*

Be it known that I, DANIEL W. SHIEK, a citizen of the United States, residing at Indianapolis, in the county of Marion and State of Indiana, have invented certain new and useful Improvements in Computing-Machines or the like, of which the following is a description.

My invention belongs to that class of devices known as adding or computing machines, wherein computations may be accurately performed mechanically by the manipulation of the proper keys or levers of the machine, and also a machine wherein the operations of the machine may be recorded and a permanent record of the keys manipulated be produced by the machine, so that if desired, several operations of the machine may be temporarily or permanently retained for checking to insure their accuracy, or for future reference.

My invention has among its objects the production of a machine that will be absolutely accurate and exact in all its operations and be easily and readily controlled to perform its various functions.

It has further among its objects a machine which is simple, durable, compact and efficient and is not liable to accidental disarrangement, rendering the same wholly or partially inoperative or inaccurate.

To this end my invention consists in the novel construction, arrangement and combination of parts herein shown and described and more particularly pointed out in the claims.

Figure 13:
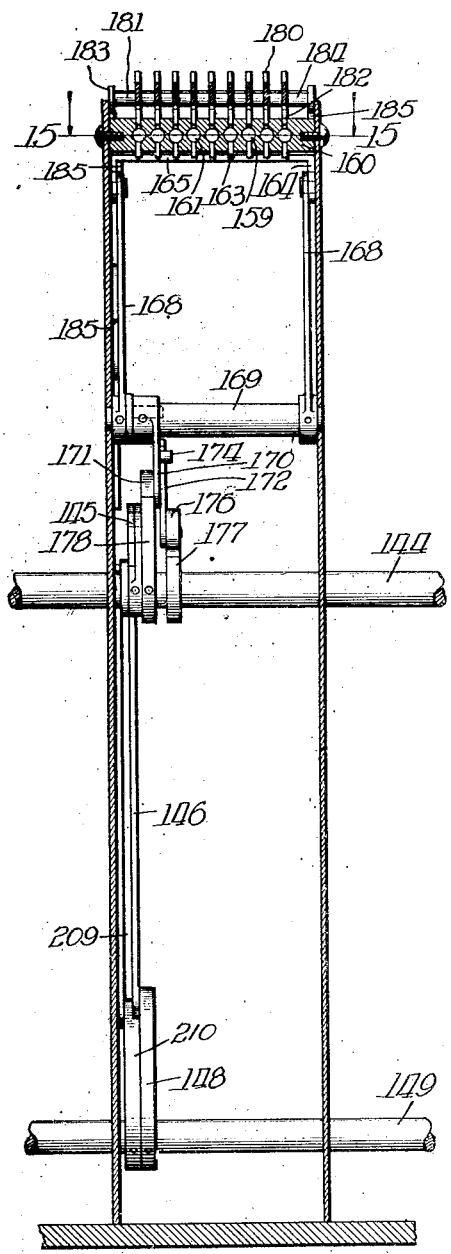
Figure 14:
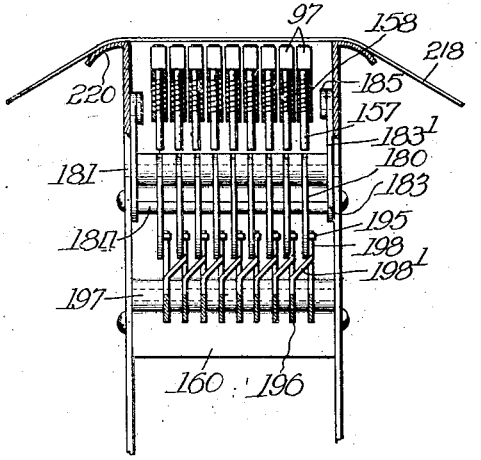
Figure 15:
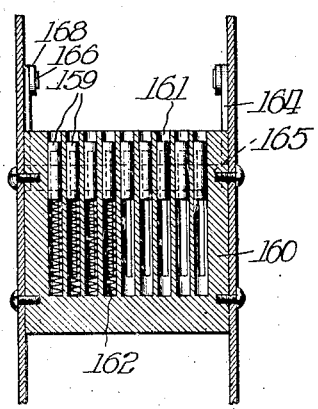
Figure 16:
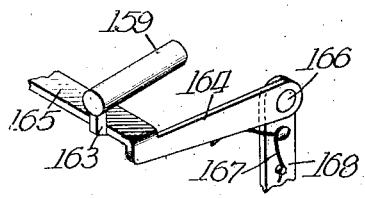
Figure 36:
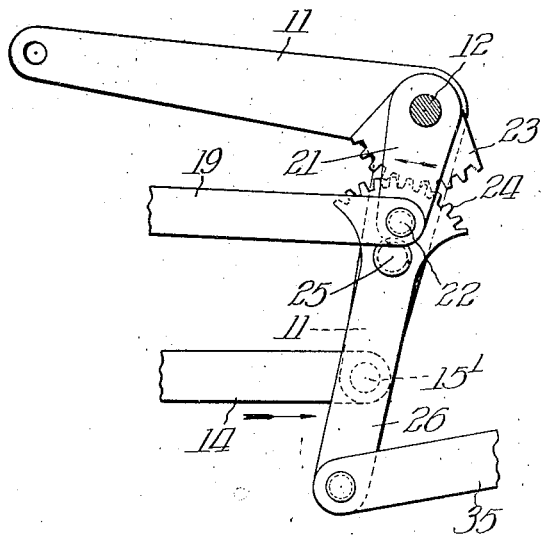
Figure 37:
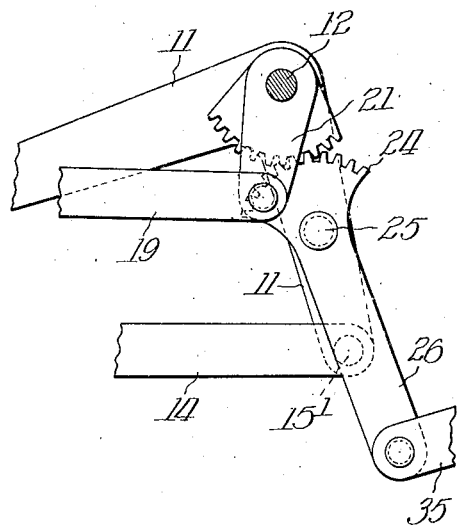

Referring to the drawings wherein like reference characters indicate like or corresponding parts. Figure 1 is a top plan view of my device, Fig. 2 is a side elevation of the same, Fig. 3 is a sectional view of the same taken substantially on line 3—3 of Fig. 1, Fig. 4 is an enlarged view of a portion of the parts shown in Fig. 3, Fig. 5 is a sectional view taken substantially on line 5—5 of Fig. 3, Fig. 6 is a sectional view taken substantially on line 6—6 of Fig. 3, Fig. 7 is a sectional view taken substantially on line 7—7 of Fig. 3, Fig. 8 is a sectional view taken substantially on line 8—8 of Fig. 3, Fig. 9 is a view taken substantially on line 9—9 of Fig. 3, a portion of the parts omitted, Fig. 10 is a sectional view taken substantially on line 10—10 of Fig. 9, Fig. 11 is a sectional view taken substantially on line 11—11 of Fig. 10, Fig. 12 is a perspective view of a portion of the slide 128, Fig. 13 is a sectional view taken substantially on line 13—13 of Fig. 3, Fig. 14 is a sectional view taken substantially on line 14—14 of Fig. 3, Fig. 15 is a sectional view taken substantially on line 15—15 of Fig. 13, Fig. 16 is a perspective view of a portion of the re-setting mechanism for the recording mechanism, Fig. 17 is a view in elevation of the gear set shown in Figs. 18 and 19, a part removed and a part broken away, Fig. 18 is a sectional view taken substantially on line 18—18 of Fig. 17, Fig. 19 is a sectional view taken substantially on line 19—19 of Fig. 17, Fig. 20 is a sectional view taken substantially on line 20—20 of Fig. 21, the parts removed being shown in dotted lines, Fig. 21 is a view in elevation of the parts shown in Fig. 20 looking in the direction of the arrow, Fig. 22 is a perspective view of one of the stop or limiting members shown in Figs. 20 and 21, Fig. 23 is a perspective view of one of the shifting or controlling members 120 for the limiting members shown in Fig. 22, Fig. 24 is a detail view of one of the pinions 106 and its resilient connection with the shaft 49, Fig. 25 is a sectional view taken substantially on line 25—25 of Fig. 24, Fig. 26 is an enlarged sectional view showing a portion of the parts shown in Fig. 3 at a period in the operation of the machine, Fig. 27 is a perspective view of the escapement gear member 77, Fig. 28 is a perspective view of the escapement member 82, Fig. 29 is a perspective view of the escapement member 79, Fig. 30 is an enlarged view of a portion of the mechanism shown in Fig. 3 showing the position of the parts at a period during the operation and just prior to the printing or recording, Fig. 31 is a side view of one of the total indicator wheels, Fig. 32 illustrates the printing of ciphers to the right or the left of a character, Fig. 33 shows a slight modification of the differential gear set or transmitting mechanism shown in Figs. 17, 18 and 19, Fig. 34 is a sectional view of the same taken substantially on line 34—34 of Fig. 33, Fig. 35 is a sectional view taken substantially on line 35—35 of Fig. 5, Figs. 36 and 37 are detail views of the complemental transmitting mechanism, showing different positions, said mechanism being also shown in Figs. 4 and 26, and Figs. 38 and 39 show a modification of the same also in different positions.

Referring to the drawings, 1 represents the frame of the machine provided with suitable intersections a—a, etc., intersecting members c—c, etc., intersections g—g, etc., tie bolts b—b, etc., and a key-board 2 provided with a plurality of series of keys 3 arranged in numerical orders, nine series or orders being shown. Each of the keys 3 is provided with a shank 4 on which are pins 5 and 6 or their equivalents, the keys being guided in their vertical movement by the key-board 2 and a key plate d (see Fig. 3). In the sectional view in Fig. 3 and the enlarged views of portions of the same the third numerical order mechanism is shown, it being understood that the other orders are substatnially the same except where more particularly pointed out hereafter.

Figure 38:
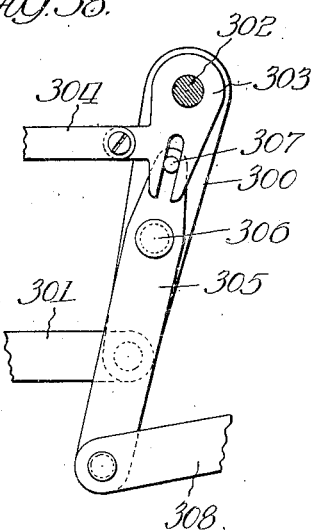
Figure 39:
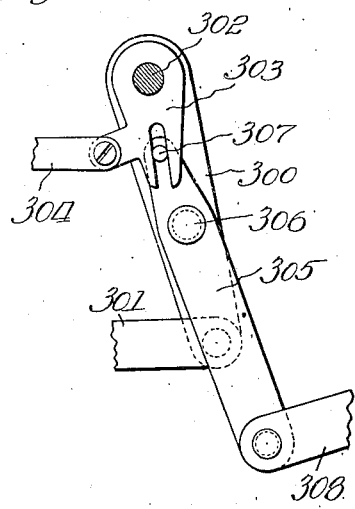

Pivotally supported at points 9 and 12 by the intersections a, etc., are bell cranks 8—8 and 11—11, the ends of the bell crank arms being connected by bars 7 and 14 pivotally secured to the arms at points 10 and 13 and 15 and 15¹ respectively. The bar 7 is arranged to coöperate with the pins 5 on the shank 4 of any of the keys in a series when a key is depressed. The bar 7 of a series is operated by any one of the keys of the series in the same order. The bars and keys are normally maintained in the position shown in Fig. 3 by a spring or resilient member 16 secured to the bar 7 and to any suitable part of the machine frame. Carried by the intersection c is a longitudinally movable bar 17 which is provided with slots 18 through which pass pins 18¹ carried by the intersection. To the bar 17 is pivotally secured by means of a pin 20 or its equivalent, a bar 19 which is pivotally secured at 22 to an arm 21 pivotally supported on the pin or shaft 12. The arm 21 is provided with a gear segment 23 secured thereto and arranged to partially rotate about the shaft 12 when the arm 21 is rotated (see Figs. 4, 26, 36 and 37). The bell crank 14 carries a gear segment 24 meshing with the segment 23 which is pivotally secured to the arm 11 at 25 and extends downwardly at 26. An equivalent structure is shown in Figs. 38 and 39 more fully explained hereafter.

A plurality of latches or stops 28 are pivotally secured at 32, etc., to the intersecting bar c, the stops being provided with an extended part 31 (except for the first key) arranged to coöperate with suitable extensions or detents 27 arranged on the bar 17, there being a stop 28 for each key except the first. The members 28 are each provided with a cam face 30 arranged to coöperate with the pin 6 on its respective key when any of the keys are depressed, and the stops 28 are normally maintained in the positions shown in Fig. 3 by means of the springs or resilient members 29. The stops 28 and springs 29 have an additional use in that they prevent the unoperated keys from dropping when any key in the series is operated.

To the lower end of the arm 26 is pivotally secured a bar 35 which is pivotally secured to an arm 34 loosely supported on the shaft 33 extending across the machine. On the shaft 33 is an arm 37 arranged to coöperate with a pin 36 on the arm 34 when the arm 34 is partially rotated about the shaft. The arm 37 is pivotally secured to a bar 38. Loosely supported on a shaft 40 extending across the machine is a gear sector or member 39 to which the bar 38 is pivotally secured by means of a pin 41 or its equivalent. The gear sector 39 meshes with a pinion 43 loosely arranged on a shaft 42 extending across the machine, which pinion is secured or operatively connected with an indicator wheel or disk 44 provided with an indicator face 45 (see Figs. 3, 4 and 6), provided with suitable numbers or other characters, as shown, from zero to nine inclusive. The indicator wheels 44 are the item indicators and are partially rotated when the keys are depressed, as will be more fully explained in the operation of the device.

On the shaft 33 is arranged what may be termed a differential gear set, which forms part of the transmission mechanism between the keys and the total indicators and comprises a ratchet 50 provided with a pinion 52 (see Figs. 4, 5, 7, 17, 18 and 19), a gear 53 provided with a casing or extended parts 54—55, a pinion 56 pivotally carried by a pin 57 and a pinion 58 pivotally carried by a pin 59 arranged on the parts 54—55 and the gear 53. The gear 53 meshes with the pinion 60 which is secured to or operatively connected to a gear 61 also loosely arranged on the shaft 33. This transmission mechanism just described substantially consists of two movable members with transmitting mechanism, as shown, the two idler pinions 56 and 58, carried by a movable support, that is, the gear 53 provided with the parts 54—55. The movable support or gear 53 is connected with the operating mechanism of another order, as will be more fully explained hereafter. A pawl 51 pivotally carried by the arm 34 is provided for operating the ratchet wheel 50, 70 being a pawl and 71 a resilient member for preventing backward rotation of the ratchet wheel 50. The gear 61 meshes with a gear 64 which meshes with a pinion 62 carried on the shaft 42. The pinion 62 is operatively connected to a total indicating or registering wheel 63 having an indicator face 63¹ substantially similar to the other indicator wheel mentioned. (See Figs. 4, 5 and 6). The item indicator wheels partially rotate and thereafter return back to zero, while the total indicator wheels continuously rotate. It is only necessary to provide one set of numbers on the item indicator or registering wheel, but on the total wheel I preferably provide two sets extending continuously so that the indicator wheel will not be of limited proportions. As the keys are operated the item indicators are rotated, as are also the total indicators, suitable carrying mechanism from a lower to a higher order being provided, as hereinafter described. The gear 53 meshes with a pinion 65 supported on the shaft 47 extending across the machine. In the lower or first order the gear 53 may be without teeth if desired, as shown the same is prevented from rotation by means of a spanner S (see Figs. 5 and 35).

The indicator wheels both item and total are provided with pins 68 or their equivalents (see Figs. 4, 6 and 26). Each item and total indicator wheel is provided with a gravity locking pawl 66 and 67 respectively, pivotally supported on a shaft 69, the same being arranged to permit the indicator wheels to rotate in the direction indicated by the arrow in Fig. 4. The gravity pawl 66 is lifted as hereafter described by means of an arm 226 secured to the shaft 69, coöperating with the pin 227 on the pawl 66, the pawl being loosely arranged on the shaft 69. The shaft 69 extends without the machine and is provided with an arm 225 secured thereto (see Figs. 1, 2 and 6). The total indicator wheels 63 are each provided with a pawl 231 (see Fig. 31) arranged to coöperate with the ratchet member 230 secured to the shaft 42, a spring 232 normally maintaining the pawl against the ratchet. The shaft 42 extends without the casing and is preferably provided with a thumb nut 228 (see Figs. 1, 2, 5 and 6). An additional stop or locking member 72 for the indicator wheels is also provided, the same being loosely supported upon a shaft 252 and provided with a hook member 255 arranged to coöperate with a pin 256 on the bar 7. Stops 254 are provided for limiting the movement of the locking member 72. The member 72 is also controlled by the operation of the machine in printing or recording items or totals, as will be more fully explained hereafter.

The carrying mechanism comprises a gear 77 for each numerical order except the highest arranged on a shaft 48 and resiliently connected through suitable escapement mechanism to a pinion 76 (see Figs. 4, 5, 27, 28 and 29). The gear 77 meshes with the gear 64 (in Figs. 3 and 4 the gear 77 of the second numerical order is not shown while the gear 77 of the third order which carries to the fourth order is shown). Omitting the escapement mechanism for the present and assuming that the gear 77 of the lower order is directly connected to the pinion 76 of the higher order the pinion 76 meshes with the gear 75 arranged on the shaft 47 which is secured to or operatively drives a pinion 65 which meshes with the gear 53 of the higher order. The gear 53 is connected through the pinions 52, 56, 58 and 60 to the gear 1 as heretofore described, which gear meshes with the gear 64 of that order which meshes with the pinion 62 of the total indicator wheel. If the gear 77 was rigidly connected to the pinion 75 the carrying would be done continuously, or that is, the indicator wheel of the higher order would be advanced a certain amount at each time depending upon the key of the lower order operated. In order that the carrying will be done at the proper time, or that is, at the time when the indicator wheel should indicate that one has been carried, I provide an escapement for controlling the operation of the pinion 76. This escapement mechanism comprises a member 79 resiliently secured to the gear 77 by means of a spring 81, the member 79 being secured to the pinion 76 (see Figs. 4, 26, 27, 28 and 29). The gear 77 is provided with lugs or extensions 78 preferably formed as most clearly shown in Fig. 27 as well as in Figs. 4 and 26, and the member 79 is provided with teeth or extensions 80 preferably formed with cam faces (in Figs. 3, 4 and 26 it might be noted as mentioned that the extensions 78 of the second order but not the gear 77 are shown). Pivotally secured on the shaft 91 is a member 82 arranged to coöperate with the extensions or lugs 78 on the gear 77 and with the extensions or lugs 80 on the member 79. The member 82 (see Fig. 28) is provided with an offset extension 84 and with offsets 85 and 86 and a hooked end 83. Pivotally supported as at 87 is a latch 89 provided with an engaging part 90 arranged to engage the offset 84 on the member 82. The latch 89 is controlled by a gravity member 88, pivotally supported at 87 and arranged to coöperate with the pin 92 on the member 89 and with the lugs 78 on the gear 77. The offsets 85 and 86 are arranged to coöperate with the detents 80 on the member 79 and the extended end 83 coöperates with the lug 78 on the gear 77, as will be more fully explained in the operation of the device.

The preferred form of printing or recording mechanism comprises a plurality of arms or type carriers 95 each carrying a series or plurality of type 97 having suitable characters formed therein, as for example, from zero to nine inclusive, the arms 95 being pivotally carried on a shaft 100 (see Figs. 3 and 30). A platen 98 is provided rotatably carried on the shaft 99 and arranged proximate to the type 97 to coöperate therewith and print or record the items or totals on a sheet of paper or the like in a manner to be more fully described hereafter. Each arm 95 is connected to a bell crank 101—102 secured on the shaft 100 by a connecting member 104 (see Figs. 4 and 9). In the case of the center one, however, the rod 104 is unnecessary as the connection may be direct. For clearness I have indicated the other rods similar to 104 as 104¹, 104², etc. for the different numerical orders. Each arm 101 is provided with a gear segment 103 which meshes with a pinion 106 arranged on the shaft 49. The pinions 106 are preferably resiliently secured to the shaft 49 by means of springs 107 and clamps 108 (see Figs. 24 and 25) so that as the shaft 49 is operated the pinion will rotate with the shaft until stopped or locked, as later described, whereupon the shaft may rotate the required distance without rotating the pinion.

The pinion 106 is in mesh with the gear segment 109 (see Fig. 4) which is carried by an arm 110 pivotally arranged on the shaft 40, the segment being provided with an extension 112 having the opposite end provided with an arm 111 and pivotally mounted on the shaft 40 (see Figs. 20, 21, 22 and 23). From the extension 112 are carried arms 115 and 115¹ which are provided with extensions 116 and 116¹ and extended ends 117 and 117¹, the members being pivotally supported or secured to the bar by means of pins 118 or their equivalent, the resilient member 119 tending to normally force them apart. The arms 111 and 110 are provided with openings 113 and 114 therethrough opposite to the extensions 116 and 116¹. The extensions 116 and 116¹ are arranged to coöperate with the gear segment 39 and the gear 64 respectively. The gear segment 39 is provided with an opening 125 and the gear 64 with a plurality of openings 126 for engagement with the extensions 116 or 116¹ respectively, as will be better understood from the description of the operation of the device. The members 115 and 115¹ are shown in Fig. 21 in inoperative or midway positions and in operation they preferably engage the segment 39 or the gear 64 at the openings 125 or 126. They are controlled by means of a member 120 preferably formed as shown in Fig. 23, having ends 121 arranged to control the ends 117 and 117¹. The members 120 are each provided with a hub 122 arranged to be secured on a shaft 123 which is longitudinally movable but not rotatable.

The shaft 123 is extended to the exterior of the machine (see Figs. 9, 10, 11 and 12), where it may be operated as desired. In the construction shown it is arranged to coöperate with a slide 128 provided with openings 129 through which the characters on the indicator wheels may be read. The slide 128 is shown in Fig. 9 in its midway position, the same being longitudinally movable and secured to the casing by means of a slot and pin connection 131, 130 at each end. When the slide is to the left the total indicator wheels may be read and when it is to the right the item indicator wheels may be read, thus avoiding any confusion in reading the indicator wheels. The preferred arrangement or control of the rod 123 is such that it is operated by the slide 128 so that when the slide is to the right for item indication the rod 123 will be to the right, which will force the member 120 to the right, causing the extension 116 to engage the opening 125 when the segment connected with the item indicator is rotated and when the slide is to the left so that the gear 64 which is connected with the total indicator is engaged by the extension 116¹ at one of the openings 126, as will be more fully understood in the operation of the device. It will be understood that normally the extensions 116 and 116¹ are not in line with the openings 125 or 126 when a key has been depressed, but that when the segment 109 is rotated by the pinion 106 it will rotate until the extension 116 or 116¹, as the case may be, reaches one of the openings in 39 or 64, whence under the pressure of spring 119 it will engage the same and lock the pinion 106 against further movement. If a key in the series has not been depressed the engagement will take place almost immediate with the operation of the pinion 106. In the construction shown the rod 123 is provided with a head 132 having an opening 133 therethrough. An arm 134 provided with a bell crank extension 136 is pivotally secured at 135 to a post 135¹. The slide 128 is provided with a cam slot 138 arranged to coöperate with a pin 137 on the arm 136, so that as the slide is moved to the left or right, it will throw the rod 123 to the left or right.

When the pinion 106 is partially rotated the sector 103 is also partially rotated about its shaft 100, bringing the type 97 into printing position, the particular type presented being controlled by the rotation of the pinion 106, the movement of which is limited by position of the segment 109. The pinion 106, as before mentioned, is resiliently secured to the shaft 49, which is provided with a gear 140 which meshes with a gear 141 carried on the shaft 142. The gear 141 meshes with and is driven by a gear 143 on the shaft 144 (see Fig. 2). The shaft 144 (see Figs. 2, 3, 4 and 30) is provided with an arm 145 secured thereto, which is pivotally connected to a bar 146 pivotally secured to an arm 148 secured on the shaft 149. The shaft 149 is provided with an arm 150 which is pivotally connected by a pin 152 or its equivalent to an operating handle 154 by means of a bar 151, the operating handle being pivotally secured to the frame of the machine at 155.

The type 97 which are slidably carried by the part 156 carried by the arm 95, are provided with shanks 157 and normaly held in retracted position by means of springs 158 or their equivalents. A plunger 159 is provided for each arm 95, the same being slidably supported by member 160 which is provided with chambers 161 (see Figs. 13, 14, 15, 16 and 30). Spring 162 arranged in the chambers 161 tend to normally force the plungers out so that they will strike the shanks 157 of the type 97 and force the same against the paper carried by the platen. Each plunger is provided with an extension 163 arranged to coöperate with a bar 165 carried by the arms 164. The arms 164 are pivotally secured to arms 168 at points 166, resilient members 167 tending to normally maintain them in position so that the bar 165 will engage the extensions 163. The purpose of the bar 165 is to reset the plungers after they have been operated, or before a succeeding operation. The arms 168 are secured to a shaft 169 which is operated by an arm 170 provided with a cam roll 171 and an arm 172 pivotally secured thereto at 173 carrying a cam roll 176. The member 172 is provided with an end 175 forming substantially a bell crank, arranged to coöperate with a pin 174 on the arm 170. On the shaft 144 is arranged a cam 177 arranged to coöperate with the roll 176 and a cam 178 arranged to coöperate with the roll 171, the cams being operated by the partial rotation of the shaft 144.

For each plunger 159 I provide a latch 180, the same being pivotally secured to the shaft 181 and provided with an extension 182 arranged to extend through an opening in the part 160 and engage the hammers or plungers 159 when retracted and maintain them in such position. On a shaft 181 are arms 183 provided with a connecting rod 184 extending under the members 180. One of the arms 183 is extended as at 183¹ and pivotally connected to a bar 185 which is pivotally secured to an arm 186 pivotally secured to the shaft 169. The arm 186 carries a pin 187 arranged to coöperate with the arm 170 and a pin 188 arranged to coöperate with a hook or latch member 189 pivotally supported from the machine at 190. The member 189 is provided with a hook 191 for the pin 188. On shaft 144 is a member or arm 192 provided with a pin 193 arranged to coöperate with the free end of the hook member 189 and release the pin 188, as described in the operation of the device. A member 196 pivotally supported at 197 and provided with an extended end 198 is provided for each member 180, the same being arranged to coöperate with the pin 195 on the member 180. The opposite end of each member 196 is arranged to coöperate with a pin 200 on the arms 95, the same being provided with a depression 199 in which the pin 200 is normally positioned when the arms 95 are not raised. As most clearly shown in Fig. 14, each of the extended parts 198 of the members 196 are provided with an extension 198¹ overlapping the extension 198 of the member 196 of the lower order. These extensions overlapping to a lower order cause the printing of ciphers in an order not operated below a higher operated order. As an illustration, they will cause the printing of ciphers to the right of a numeral, for example, as shown in line 2, 3, 4, 5, 8 and 9 of Fig. 32, it being understood that they have no effect in an order in which a key has been operated.

As most clearly shown in Fig. 2, on the shaft 99 carrying the platen 98 is a ratchet wheel 205 arranged to coöperate with an arm 206, carrying a resiliently operated pawl 206¹, arranged on the shaft 207. As the shaft 207 is oscillated the platen is advanced a certain distance. The shaft 207 has an arm 208 secured thereto, which arm is pivotally connected to a bar 209 pivotally secured to an arm 210 arranged on the shaft 149. The arm 210 is provided with a pin 211 arranged to coöperate with the arm 148 when the same is operated, thereby operating the shaft 207.

Referring particularly to Figs. 2 and 3, on a shaft 214 is pivotally supported an arm or lever 213 for each member 196, which arm is provided with an end adapted to coöperate with a pin 216 on the member 196. The purpose of these arms is to control the printing mechanism to print ciphers to the left to indicate decimal places as shown in Fig. 32. Referring to this figure, the top line shows how ciphers may be printed without operating any keys, in this case, the lever 213 of the fifth order was operated, so that until this lever is returned to normal ciphers will be printed to the right of any characters printed in a lower order. As for example, lines 3, 4, 5 and 6 show 2, 3, 4 and 5 decimal places respectively. Lines 7, 8, 9 and 10 show the result where the lever 213 in the third numerical order is operated.

Between the type and the platen is arranged the usual type or inking ribbon 218 which is carried by spools 219 or their equivalents controlled in any suitable manner, not necessary to describe here, so that the inking ribbon may be fed across the front of the type. Suitable guides 220 are shown for maintaining the ribbon in place (see Figs. 1 and 2).

The item and total indicator wheels 44 and 63 which are driven by the pinions 43 and 62 on the shaft 42 are, as before mentioned, controlled by the locking pawls 66—67 and pawl 72 arranged to coöperate with the pins 68 to normally prevent backward movement of the indicator wheels and to lock them in position during the printing or recording operation. The pawls 66 and 67 which are gravity operated, are loosely arranged on the shaft 69. The pawl 66 is controlled by a lifting member 226 secured to the shaft 69 and arranged to coöperate with a pin 227 on the pawl. The shaft 69 is preferably extended without the casing and provided with a latch member 225 secured thereto. Referring particularly to Fig. 31, on the shaft 42 is arranged a cam member 230 arranged to coöperate with a pawl 231 carried by the indicator wheel or disk 63, the same being normally maintained in contact with the cam 230 by a resilient member 232. The shaft 42 extends without the casing and is provided with a thumb nut 228. Turning the shaft 42 alines and brings the total indicator wheels to zero.

Arranged on the shaft 69, on the exterior of the machine (see Fig. 2), is an arm 233—247 which is provided with a pin 234 arranged to coöperate with the latch 225, the arm 233 being provided at the free end with a cam shaped member 235 pivotally secured thereto and with a coöperating pin 236 for the cam member. Pivotally supported at 239 is a bell crank arm 237—238, the arm being extended as at 240 and provided with a cam roll 241. On the shaft 49 is arranged a cam member 245 arranged to coöperate with the roll 241. Pivotally secured to the arm 247 is a link 246 provided with a slot 248 through which passes a pin 249 on the member or arm 238. The free end of the arm 238 is pivotally secured to a bar 250 which is pivotally secured to a crank arm 251 secured to the shaft 252, which shaft carries the members 72. Each of the members 72 is provided with a pin 259 arranged to coöperate with a member 258 secured to the shaft 252 (see Figs. 4 and 26).

To prevent the operation of the totaling mechanism or throw the same out of operation when desired I provide a controlling member 260 for the pawl 51. As shown, the controlling member is slidably supported by a slot and pin connection 262—261 controlled by an arm 264 coöperating with a pin 263 on the member 260. The arm 264 is rigidly secured to a shaft 265 which is operated by a lever 266. Any suitable means may be employed for locking the lever 266, a latch member 267 arranged to coöperate with a pin 268 on the lever 266 being shown for the purpose (see Figs. 2 and 3).

The operation of the machine may be briefly described as follows: Referring first to Figs. 3, 4 and 26. Assuming the eighth key in the third order is depressed, the bar 7 is forced down by the pin 5, the bell cranks 8—8 and 11—11 turning about the centers 9 and 12. At the same time that the key is depressed the member 28 for that key is forced into the position shown in Fig. 26 by the pin throwing up the stop 31 to engage the detent 27 when the same reaches the stop 31. It is understood of course that operation of any of the other keys in the series or order depresses the bar 7 and its respective member 28, but it will be noted by referring particularly to Fig. 3 that the travel of the bar 17 will vary depending upon the key depressed, there being very little movement when the 9th key is depressed and the greatest travel of the bar 17 when the first key is depressed. In the last instance the travel of the bar 17 may be limited by the mechanism and not necessarily by a stop member 28. Movement of the bell crank arm 11—11 carries the pin 25 toward the rear of the machine and the first movement of the bell crank tends to normally rotate the sector 23 on the sector 24, the end of the arm 26 normally holding its position (see Figs. 4 and 26). Movement of the sector 23 moves the arm 21 which through the bar 19 draws the bar 17 to the rear until the detent 27 engages the stop 31, whereupon the continued movement of the key in completing its travel moves the arm 26 about its pivot 25, the sector 23 being held by the bar 17. The result is a compound lever, giving the movement described, first, movement of the bar 17, and then movement of the lower end of the arm 26, which latter movement, as is obvious, will vary with the travel of the bar 17. As the arm 26 is operated the arm 34 is rotated about the shaft 33 and the pin 36 engaging the arm 37 raises the bar 38, thereby rotating the gear segment 39. This rotates the pinion 43 (see Fig. 6) and turns the indicating wheel 44 a certain distance, depending upon the key depressed, thus indicating which key was operated. At each movement of the arm 34 the pawl 51 carried by the arm rotates the ratchet 50, thereby through the pinions 52, 56, 58, 60, gear 61 and pinion 62, rotating the total indicator wheel 63. The gear 53 is held against rotation by the pinion 65 with which it is in mesh and the other parts of the mechanism.

The item indicator wheels 45 and total indicator wheels 63 are normally held against a reverse rotation by the stops or pawls 66 and 67 arranged to engage the pins 68 on the indicator wheels. The item indicator wheels reciproc.e or return to normal position at the end of each operation of the machine, as will be more fully explained hereafter, while the total indicator wheels rotate continuously in the same direction. The ratchets 50 are prevented from a reverse rotation during each operation of the pawl 51, returning to the position shown in Fig. 4 by means of the spring actuated pawls 70. At the end of the movement of the depressed key a pin 256 on the bar 7 engages the hooked end of the hook member 255, thereby raising the locking member 62 so that it engages both indicator wheels and prevents overthrow of the indicator wheels and also prevents any movement of the same during the recording operation hereafter described.

As heretofore mentioned, whenever a total indicator wheel has moved ten intervals or points one is carried to the indicator wheel of the next higher order. Omitting for the present the escapement mechanism for the purpose of clearness, the gear 77 in the lower order, for example, in the second numerical order of tens order, is driven from the total indicator gear 64 of that order, thereby driving the pinion 76 which drives the gear 75 of the next higher or third order (see Figs. 5 and 6), which drives the pinion 65 and, through this drives gear 53 of the third order. However, the ratchet 50 of the third order is prevented from movement backward by the stop of pawl 70 so that the pinion or smaller gear 52 is prevented from rotating. Gear 53 being rotated and gear 52 held stationary, the pinion 60 and gear 61 are driven through the pinions 56 and 58, but the gear 61 meshing with the gear 64 of the higher or third order which drives the pinion 62 of that order, rotates the indicator wheel to carry one. It is of course understood that if the ratchet 50 and gear 52 of the third order are being operated at this time the result, as far as the carrying and mechanical movement are concerned, is the same as if it were held stationary. In other words, it is not necessary to delay or retard the carrying mechanism of one order while the mechanism of the next higher order is being operated by the keys. To cause the carrying to be done, however, after the ninth interval or point or travel of gear 64 of the lower order rather than continuously, the escapement mechanism is provided, as mentioned, so that the one is carried on the tenth interval. The gear 77 of the lower order is rotated at each rotation of its meshing gear 64, but owing to the stop 85 on the member 82 engaging one of the extensions 80, the member 79 is not rotated during the first nine intervals, the member 82 being retained by the latch member 89 or by one of the extensions 78. As the gear 77 is rotated, one of the lugs or extensions 78 gradually approaches and raises the latch member 88, thereby finally releasing the extended end 84 (see Figs. 4 and 26). At this time the cam extension 80 on member 79 tends to force the member 82 out to release itself, but the member 82 is prevented from being so moved by the extended end 83 coöperating with the extension 78 on the gear 77 which has just approached. At the tenth interval the extension 83 drops off of the adjacent extension 78, and the member 80 then forces away the member 82 and escapes, but the preceding cam member 80 thereafter engages the extension 86 on the member 82 and returns the same in time to engage the cam extension 80 succeeding the one which has just escaped. In the meantime the latch member 88 drops between two of the extensions 78, thereby permitting the latch 89 to engage the extension 84 and again locking the escapement mechanism until one is to be again carried. Owing to the resilient connection between the member 77 and the member 79 the pinion 76 is rotated when the escapement takes place, which drives the gear 75 of the higher order, which drives the pinion 65 and through this and the gears heretofore mentioned, drives the gear 64 of the higher order, thereby moving or rotating the indicator wheel to carry one. In the first numerical order, there being no lower order to carry from, it is not necessary to provide a gear 53 for the mechanism just described, so that a dummy gear member 53 may be provided in this order, provided with the parts 54—55 and means for preventing the rotation of these parts, for example, the spanner S serves this purpose, and also in the highest numerical order provided on the machine it is not necessary to provide a gear 77 since there is no higher numerical order to carry to.

Assuming that the desired keys have been operated and it is now desired to record the item, the slide 128 is pushed to the right, if not in that position, displaying the item indicator wheels and at the same time throwing the rod or shaft 123 to the right so that the extension 116 on member 115 (see Figs. 20 and 21) is permitted to pass through the opening 113 and be resiliently maintained against the faces of the gear segment 39 so that it will engage the same through the opening 125 when the segment 109 is rotated. The operating handle 154 is now pulled forward, thereby rotating the shaft 149 in the direction indicated by the arrow in Fig. 30. This rotates the shaft 141 and (see Fig. 2) the pinions 106 are resiliently driven by the rotation of shaft 49 through the gears 140, 141 and 113. The segment 109 will therefore be rotated about the shaft 40 until the segment 39 is engaged by the member 115, at which time the pinion 106 will be locked against further movement, but the shaft owing to the resilient connection is free to continue its rotation. By the rotation of the pinion 106 the segment 103 is rotated about its shaft 100 until the pinion 106 is locked, as mentioned (see Figs. 1 and 30), thereby through the arm 102 and rod 104 (see Fig. 9) rotating the type carrying arm 95 about the shaft 100. The type 97 are successively brought to printing position before the platen until the pinion 106 is locked by the segment 109 (see Fig. 30), at which time the proper type is in printing position.

In the meantime the cams 178 and 177 (see Fig. 30) have raised the arm 170, thereby rotating the arm 168 about the shaft 169 so that the bar 165 forces the plungers 159 back retracting the springs 162 where they are engaged by the extensions 182 on the gravity latches 180, the pin 200 on the arm 95 having raised the members 199, thereby lowering the end 198 and permitting the latches 180 to drop. The arm 170 in raising engages the pin 187, thereby raising the bar 185 and arm 183¹ lowering the cross bar 184, the arm 186 being raised until the hook 191 engages the pin 188 on the member 186. Continued movement of the shaft 144 causes the roll 176 to pass over the cam face 177, the roll 171 having been raised, as shown in Fig. 30, so that the arm 170 drops, the arm 186 being still held by the hook member 189. The arm 170 having dropped has retrieved the bar 165, the required plungers 159 being retained by the gravity latches 180.

If any of the type bars have not been raised either by operation of the keys or by carrying, then the members 196 for those bars are not raised so that the gravity latches 180 are retained up (see Fig. 3). In this case the plungers 159 follow the bar 165 when it is retrieved and returned to inoperative position. If any of the type carrying arms 95 below a raised higher order arm are not raised either by operating or carrying, thereby indicating a zero or cipher, the next higher order owing to the overlapping part 198¹ (see Fig. 14) will depress the end 198 of the next one or more lower ones so that the plunger or plungers will be engaged by its respective latch 180 and maintained in operative position. Further movement of the operating handle and consequently shaft 144, brings the pin 193 on the arm 192 into engagement with the lower end of the member 189, thereby disengaging the pin 188 from the hook 191 (see Fig. 30). The arm 186 therefore drops (the arm 170 having previously dropped, as heretofore mentioned), thereby through the arm 183¹ and spring 183² raising the bar 184, raising the gravity latches 180 that are in engagement with the plungers 159. The plungers 159 under the pressure of the retracted springs 162 are thereupon forced out and striking the shanks or stems 157 of the type in printing position, thereby recording on the paper carried by the platen the item that has been indicated by the indicator wheels.

In the printing or recording of a total, it being understood that no keys are to be operated as in indicating or printing an item, the operation is the same except that in this case the slide 128 is pushed to the left, thereby moving the rod 123 to the left so that the extension 116¹ is in position to engage one of the openings 126 in the gear 64 (see Figs. 20 and 21). The gears 64 have totaled and carried as heretofore described. This gear continually rotates so that there are a plurality of openings 126, it being understood that the operation of the member 115¹ and consequently the operation of the pinion 106 and the type bars 95 are the same.

Up to the time that the operating handle is thrown the indicator wheels, both item and total, are prevented from rotating in a forward direction by the pawl members 66 and 67. Upon the operation of the operating handle 154, for recording an item or total and consequently the rotation of the shaft 49, the cam 245 (see Figs. 2 and 5) is rotated, which forces the upper end of the bell crank 237—238 forward and the lower end 238 rearward, and through the bar 250 and arm 251 the shaft 252 is rotated. This rotates the catches 258 so that they engage the pins 259 and the locking members 72, thereby locking the indicator wheels. If no keys have been operated, as for example, in the case of recording a total, when the operating handle is thrown the members 72 would not be in engagement with the pins of the indicator wheels as in the case of the key operating. By this arrangement, however, the indicator wheels are locked as well in taking a total. Movement of the arm 238 rotates the arm 247 through the bar 246 and the rotation of this bell crank 247—233 operates the latch 225, which coöperates with the pin 234 on the arm 233, thereby rotating the shaft 69 (see Fig. 2). Rotation of the shaft 69 raises the members 226 which coöperate with the pins 227 on the latches 66 controlling the item indicator wheels, which do not continuously rotate in one direction. The item indicator wheels are therefore released from the catches 66 but maintained against reverse rotation by the locking members 72. As the arm 237 travels forward it engages under the cam 235 which coöperates with the pin 236. The end 240 of the arm 237 and the cam member 235 maintain the latches 66 up until the operating handle has been returned rearward, so that the item indicator wheels may return back to zero. By the time they have reached their zero position the cam 235 has slipped off the end of the extension 240 so that the catches 66 again drop and engage the pins 68 of the item indicator wheels.

As the handle 154 is returned rearward the shaft 149 is partially rotated in a reverse direction than before described, so that the arm 148 as it returns engages the pin 211 on the arm 210 and partially rotates the shaft 207 through bar 209 and arm 208 (see Fig. 30) and this positively rotates the platen 98 through the resiliently operated pawl 206¹ (see Fig. 2) which had already taken a new bite, or that is, engaged a tooth on the ratchet 205 at the first throw or operation of the operating handle forward. In this manner the paper is advanced before the type ready for the next printing operation. Upon the return stroke of the operating handle or movement rearward, the shaft 49 is rotated in the reverse direction, thereby rotating the pinions 106 in the reverse direction and returning the segments 103 and 109 back to the position shown in Fig. 4, the lock 72 of the indicator wheels having been permitted to drop by reason of the reverse rotation of the shaft 252. The pinions 106 on being rotated in the reverse direction permit the resilient member 46 to draw down, the bar 38 and the item indicator to return to zero, assuming that the indicator segment 39 is the one engaged. If the total gear 64 has been engaged by 116¹, or that is, a total has been taken, of course in this case the total indicator wheels are stationary, the gear 64 also remaining stationary.

In case it is not desired to accumulate or add, the lever 265 (see Fig. 2) may be drawn to raise the member 260 (see Fig. 4), thereby disengaging the pawl 51 from the ratchet 50, in which case there will be no accumulation, as is obvious.

If it is desired to cancel the item after the keys have been operated, the lever 225 may be depressed, thereby rotating the shaft 69 as heretofore described, and releasing the catches 66. The total indicator wheels may be brought back to zero at any time by operating the thumb nut 228 (see Fig. 31) and rotating the shaft 42, carrying the ratchet 230 so that the ratchet will engage all of the pawls 231, alining them so that they may be rotated until they all register zero.

The operation of the decimal mechanism, which as before mentioned. is to enable the operator to print ciphers to the left as desired, may be briefly explained as follows: Referring particularly to Figs. 2 and 3, in which the same is shown, and to Fig. 30, (in which, however, the decimal levers are omitted) and to Fig. 32 in which the results are illustrated, and heretofore briefly described, the first line shows five decimal places while lines 2, 3, 4, 5 and 6 show three-tenths and down to the fifth decimal place. The remaining lines show that characters printed on the first three orders represent decimals. In the first examples the lever 213 in the fifth order is depressed at its forward end, which coöperating with the pin 216 on the member 196 acts the same as the operation of the pin 200, that is, it permits end 198 to drop, thereby permitting the gravity latch 180 to drop and engage the plunger 159 of the fifth order when the plunger is retracted. The type bar 95, however, not being raised, the zero type is opposite the printing point on the platen so that as the machine is operated the plunger in the fifth order is released, printing a cipher to the left. The printing of any ciphers to the right of the number printed is the same as heretofore described, being controlled by the overlapping extensions 198¹. In the same manner ciphers to the right of the cipher representing the first decimal place and up to the number are printed by the overlapping extensions 198¹. In this manner by depressing the forward end of the decimal lever 213 the decimal point may be maintained throughout the recording of items or totals. It is of course understood that this does not in any way interfere with the operation of the machine in printing characters to the left of a decimal point.

In Fig. 33 is shown a bevel gear arrangement as a modification of the differential shown in Fig. 17. In this case the bevel gear 280 would represent the pinion 52 and the pinion 282 which is driven through a bevel pinion 281 from the pinion 280 would represent the pinion 60, the results being substantially the same as with the other construction.

As shown in Figs. 36 and 37 the novel mechanism heretofore described for transmitting the invariable reciprocation of the bar 14 to the variable movement of the link 35 is illustrated in detail. As explained, the bell crank lever 11—11 is pivotally mounted on the shaft 12 and may be termed a driving member. On the same shaft is loosely mounted the gear segment or cog rack 23 having secured thereto or formed integral therewith a depending arm 21 with which the free end of bar or link 19 is pivotally connected. As illustrated in Figs. 4 and 26, the distance the bar 19 is permitted to move is regulated by the particular key operated, and the intermediate mechanism between the two. The movement of the bar 19 is therefore variable. Upon the depending arm 11 of the bell crank is also pivoted a lever 26 at a point between its ends, as at 25 where not pivoted between the ends of lever 26, the movements are substantially similar except in opposite directions. One end of said lever is pivoted with a cog rack 24 coöperating with the cog rack 23 while the other end of said lever 26 is connected with a link 35.

The operation is as follows: The forward movement of the link 35 and its connecting parts is retarded by the friction of the various operating parts with which the other end of the link 35 is engaged, and as the bar 14, which for the sake of explanation may be considered as the motive force in this case, forces the end of the depending arm 11 forward, the said friction tends to hold the lever 26 immovable rotating the cog rack or gear segment 23 in the direction indicated by the arrow, and this movement is continued until further movement in that direction is prevented by the limited movement of the bar 19 controlling the same. This action thereafter holds the cog rack 23 immovable, and further movement of the driving bar 14 causes the cog rack 24 to travel on a fixed cog rack 23 as a track, throwing the other end of the lever 26 and the bar 35 forward a distance permitted by the continued further movement of the bar 14 to its limit. It will be seen from this that the distance the link 35 is driven forward is dependent upon the distance the bar 19 is permitted to move before it is stopped. In other words, while the bar 14 is given a regular reciprocating movement backward and forward always the same distance, the link 35 is giving a variable movement dependent upon the control of the movement of the bar 19, which as before stated, in the particular device of this application is regulated by the particular key operated. Fig. 37 shows the position of the parts substantially at the moment when the bar 14 has reached its forward limited movement in one of the operations of the device.

In Figs. 38 and 39 a modified form is shown also illustrating the different positions, substantially as just described. As here illustrated a lever 300 is given an oscillating movement by a link 301 which moves forward and backward an equal distance at each reciprocation. 302 is the pivotal support of the lever, on which also is loosely mounted a depending forked member 303, having connected therewith a bar 304 which may be regulated as to its reciprocation. A lever 305 is pivotally mounted upon the lever 300 as at 306 having one end provided with means, as for example, the pin 307, engaging the forked member 303. The free end of the lever 305 is pivotally connected with the link 308. As here shown the operation is substantially as before described, the regular reciprocation of the bar 301 resulting in a variable reciprocation of the link 308, regulated by the controlled variable reciprocation of the link 304.

As shown in Figs. 4 and 26, the various coöperating parts are mounted upon the pivotal support of the bell crank 11—11 for convenience and compactness in the construction. If preferred, however, the form illustrated in Figs. 38 and 39 may be employed, the link or bar 301 serving to connect the depending end of the bell crank 11—11 to the lever 305, the two parts being located some distance apart.

The mechanism herein described is available for various purposes, and in devices other than the one herein shown, in which it is desirable to transmit the regular reciprocation of a member to produce a variable movement of the connected parts. It will also be seen that the movement of the variable member is positive and that they cannot overthrow, no matter how rapidly the parts may be operated.

It will thus be noted that in my machine the gears throughout are always in mesh and that the adding is continuous and the totals may be read at any time by moving the slide 128. Sub-totals may be taken at any time in the operation of the machine by moving the slide to the left and operating the handle 154. Any other means than that shown may be employed for reciprocating the shaft 149, and I do not wish to be understood as limiting myself to a manually operated mechanism. The total standing on the total indicator wheels being always visible by simply moving the slide 128 to the left, there is no need for signal mechanism for indicating whether there is a total on the machine, but if desired, any arrangement preferred may be employed for indicating on the paper when a total or sub-total has been taken.

Having thus described my invention it is obvious that various immaterial modifications may be made in the same without departing from the spirit of my invention, hence I do not wish to be understood as limiting myself to the exact arrangement, construction or combination of parts shown and described, or uses mentioned.

What I claim as new and desire to secure by Letters Patent is;

1. A computing machine, comprising an item indicator and a total indicator and a series of operating keys therefor, intermediate transmitting mechanism between said keys and said indicators whereby the movement of the keys is transmitted to the indicators, said transmitting mechanism comprising a driven member, a driving member and a limiting member coöperating with the keys to advance said indicators a distance predetermined by the value of the key operated.

2. A computing machine, comprising an item and a total indicator and a series of operating keys therefor, intermediate transmitting mechanism between said keys and said indicators whereby the movement of the keys is transmitted to the indicators, said transmitting mechanism comprising a driving member coöperating with the keys, a driven member and means for operatively connecting the same with the indicators, and a limiting member, said transmitting mechanism coöperating with the keys to advance said indicators a distance predetermined by the value of the key operated.

3. In a device of the kind described provided with mechanism for a plurality of numerical orders, the combination of a plurality of actuating keys and an item and a total indicator for each order, transmitting mechanism between said keys and said indicators, including a driving member connected with the keys and driven thereby, a driven member and a limiting member, said driving, driven and limiting members coöperating to limit the movement of said driven member.

4. A computing machine, comprising an item and a total indicator, a series of operating keys and transmitting mechanism between said keys and said indicators including a bell crank having one end operatively connected with the keys and provided at the other arm with a lever pivotally carried thereby and operatively connected with said indicators, said lever provided with a gear segment at one end, a slidable bar and means coöperating with the keys for limiting the movement thereof, and a bell crank pivotally supported at the pivotal center of said first bell crank and provided with a gear segment on one arm thereof in mesh with said gear segment on said lever, the other arm of said bell crank connected with said slidable bar.

5. A computing machine comprising an item and a total indicator and a series of operating keys, intermediate transmitting mechanism between said keys and said indicators comprising a bell crank lever and transmitting mechanism between the keys and said bell crank, a bell crank pivotally connected with said first mentioned bell crank provided with a gear segment on one arm thereof, means secured to the other arm of said bell crank for limiting the movement thereof, said limiting means coöperating with the key depressed, a lever pivotally carried by first mentioned bell crank and provided with a gear segment in mesh with said bell crank segment and connected through intermediate mechanism with said indicators.

6. In a computing machine or the like and in combination, a plurality of registering wheels, a series of operating keys for each wheel, intermediate transmitting mechanism including two members arranged to move in opposite directions, a transmitting member between the two secured to a movable support, said support coöperating with the operating mechanism of the next adjacent registering wheel to advance the former a fixed distance relative to the movement of the latter.

7. In a device of the kind described and in combination, a plurality of registering wheels, a series of operating keys for each wheel, intermediate transmitting mechanism, including two movable members, transmitting means between said movable members, and a movable support for said transmitting means, said support connected with a portion of the transmitting mechanism of another order whereby the registering wheel of the former order is advanced a fixed distance relative to the movement of the indicator wheel of the latter order.

8. A computing machine or the like comprising a plurality of registering wheels, a series of operating keys for each wheel, and intermediate transmitting mechanism including two members arranged to rotate about a common center, transmitting means between said members carried by a rotatable support, said support coöperating with the operating mechanism of the next lower order whereby said support is rotated a fixed distance relative to a fixed movement of the latter.

9. A computing machine or the like comprising a plurality of registering wheels, a series of operating keys for each wheel, and intermediate transmitting mechanism including two members arranged to rotate about a common center in opposite directions, transmitting means between said members carried by a rotatable support, said support coöperating with the operating mechanism of the next lower order whereby said support is rotated a fixed distance relative to a fixed movement of the latter.

10. A computing machine or the like comprising a plurality of registering wheels, a series of operating keys for each wheel and intermediate transmitting mechanism including a ratchet and a gear, arranged to rotate about a common shaft, transmitting mechanism between said ratchet and said gear, a rotatable support for said transmitting mechanism arranged on said shaft and means for operatively connecting said support with the operating mechanism of an adjacent order.

11. A computing machine or the like comprising a plurality of registering wheels, a series of operating keys for each wheel and intermediate transmitting mechanism, including a ratchet and a gear, arranged to rotate about a common shaft in opposite directions, transmitting mechanism between said ratchet and said gear, a rotatable support for said transmitting mechanism arranged on said shaft and means for operatively connecting said support with the operating mechanism of an adjacent order.

12. In a computing machine or the like, a plurality of registering wheels, a series of operating keys for each wheel and intermediate transmitting mechanism between said wheels and keys, including a driving member and a driven member mounted upon and arranged to rotate about a common shaft and transmitting means between the said members and rotatable supporting means for said transmitting means.

13. In a computing machine or the like, a plurality of registering wheels, a series of operating keys for each wheel and intermediate transmitting mechanism between said wheels and keys, including a driving member and a driven member mounted upon and arranged to rotate in opposite directions about a common shaft and transmitting means between the said members and rotatable supporting means for said transmitting means.

14. A computing machine or the like comprising a plurality of registering wheels, a series of operating keys for each wheel and intermediate transmitting mechanism between said wheels and keys, including a driving member and a driven member mounted upon and arranged to rotate about a common shaft, transmitting mechanism between said members, a rotatable support for said transmitting mechanism rotatably mounted upon said shaft, said supporting member operatively connected with the operating mechanism of the adjacent lower order.

15. A computing machine or the like comprising a plurality of registering wheels, a series of operating keys for each wheel and intermediate transmitting mechanism between said wheels and keys, including a driving member and a driven member mounted upon and arranged to rotate in opposite directions about a common shaft, transmitting mechanism between said members, a rotatable support for said transmitting mechanism rotatably mounted upon said shaft, said supporting member operatively connected with the operating mechanism of the adjacent lower order.

16. In a computing machine or the like, a plurality of registering wheels, a series of operating keys for each wheel, an intermediate transmitting mechanism between said wheels and keys, including a driving member and a driven member mounted upon and arranged to rotate about a common shaft, means for limiting the rotation of said driving member to one direction, transmitting mechanism between said members, a support for said transmitting mechanism rotatably mounted upon said shaft and normally rotatable in the same direction as said driven member, said supporting member operatively connected with the operating mechanism of the adjacent lower order.

17. A computing machine or the like comprising a plurality of registering wheels, a series of operating keys for each wheel and intermediate transmitting mechanism including two members arranged to rotate about a common shaft, transmitting means between said members, a support for said transmitting means rotatably mounted upon said shaft and means for operatively connecting said support with the operating mechanism of the next lower order whereby said support is periodically rotated a fixed distance relative to a fixed movement of the operating mechanism of the lower order.

18. A computing machine or the like comprising a plurality of registering wheels, a series of operating keys for each wheel and intermediate transmitting mechanism including two members arranged to rotate in opposite directions about a common shaft, transmitting means between said members, a support for said transmitting means rotatably mounted upon said shaft and means for operatively connecting said support with the operating mechanism of the next lower order whereby said support is periodically rotated a fixed distance relative to a fixed movement of the operating mechanism of the lower order.

19. In a device of the kind described and in combination, a plurality of registering wheels, a series of operating keys for each wheel and intermediate transmitting mechanism including two members arranged to rotate about a common center, means for limiting the rotation of one of said members to one direction, and means for rotating said member in said direction, transmitting mechanism between said members, a support for said transmitting mechanism rotatable about said center in a reverse direction to said limited member and means for connecting said support with the operating mechanism of the next lower order whereby said support is prevented from rotating or is periodically rotated a fixed distance relative to a fixed movement of the operating mechanism of the lower order.

20. In a computing machine provided with a plurality of keys, indicators and transmitting mechanism between said keys and indicators, a gear rotatably mounted upon a shaft and connected with the mechanism of the adjacent lower order, a member resiliently connected therewith and rotatable upon said shaft and means coöperating with said gear and member for periodically retarding said member relative to said gear, comprising an escapement member coöperating with said member and said gear and a latch member coöperating with said gear and said escapement member.

21. In a computing machine, a plurality of keys, indicators and transmitting mechanism between said keys and indicators, escapement mechanism comprising a gear provided with a plurality of lugs thereon, said gear rotatably mounted upon a shaft and connected with the mechanism of the adjacent lower order, a member provided with cam face teeth thereon resiliently connected with said gear and rotatable upon said shaft and means coöperating with said gear and member for periodically retarding said member relative to said gear comprising an escapement member coöperating with said lugs and teeth and a latch member for said escapement member and means coöperating with said lugs for disengaging said latch and escapement member.

22. In a computing machine and in combination, item and total indicators, a semi-rotatable gear segment for partially rotating said item indicator and a rotatable gear for rotating said total indicator, means for partially rotating said segment or rotating said gear, a semi-rotatable gear segment provided with means for engagement with said gear segment or gear as desired, means for controlling said engaging means, a pinion meshing with the segment carrying said engaging means, means resiliently connected therewith for driving said pinion and a type carrier provided with a gear segment meshing with said pinion.

23. In a device of the kind described and in combination, item and total indicators, a semi-rotatable member connected with said item indicator and a rotatable member connected with said total indicator, means for partially rotating said semi-rotatable member or rotating said rotatable member, a semi-rotatable engaging member provided with means for engagement with either of said other members as desired, means for controlling said engaging means, means connected with said engaging member, said means provided with resilient driving means, and a type carrier connected with said resiliently driven member.

24. In a device of the kind described provided with mechanism for a plurality of numerical orders, including a plurality of actuating keys for each order, means for recording items or totals comprising a platen, a plurality of type for each numerical order, and a plurality of longitudinally movable plungers for actuating said type.

25. In a device of the kind described, provided with mechanism for a plurality of numerical orders, a plurality of operating keys for each order and the combination of means for recording items or totals, including a platen, type, type carriers, actuating means for the type carriers, actuating means for said type comprising a plurality of plungers, means for setting said plungers, means for releasing the same and means for actuating said plungers when released.

26. In a device of the kind described, provided with mechanism for a plurality of numerical orders, a plurality of operating keys for each order and the combination of means for recording items or totals, including a platen, type, type carriers, actuating means for the type carriers, actuating means for said type comprising a plurality of plungers, means for setting said plungers, means for engaging and maintaining said plungers in set positions, means for releasing the same and means for actuating said plungers when released.

27. In a computing machine of the kind described and in combination, means for recording the operations of the machine, comprising a platen, a plurality of type, a carrier therefor, means operatively connected with the indicators and driving shaft for actuating said carriers, means for operatively actuating the type presented, comprising a plunger, means for setting said plunger, means for retaining said plunger in set position, means for releasing said retaining means, means for actuating the plunger and forcing the same against the type.

28. In a device of the kind described for printing individual items and accumulating and printing the total thereof, type, means for actuating the same to print, comprising a plurality of plungers, supporting means therefor, resilient means for actuating said plungers, means for retracting said plungers, latches for maintaining said plungers in a retracted position and means for disengaging said latches.

29. In a device of the kind described for printing individual items and accumulating and printing the total thereof, type carriers, a series of type for each carrier and means for actuating the same, comprising a plurality of spring actuated plungers, means for controlling said plungers comprising a rock shaft and means for operating the same, a plurality of cams secured on said shaft, a bell crank, one arm of said crank arranged to coöperate with said cams and the other arm provided with means for engaging and retracting said plungers and their actuating springs, a plurality of latches for maintaining said plungers in retracted positions, controlling members engaging said latches and coöperating with said type carriers, means for normally operating said latches comprising connecting means between said latches and shaft arranged to lower the same to engage said plungers, and means for thereafter operating said latches to release said plungers.

30. In a computing machine, operating keys, an operating lever, and printing mechanism including a platen, type, type carriers for said type, controlling and actuating means for said type carriers, comprising means coöperating with the key mechanism and means coöperating with said operating lever, actuating means for said type comprising a plurality of spring actuated plungers, means actuated by said lever for engaging and retracting said plungers, a plurality of latches for engaging the plungers to be operated, means coöperating with the type carriers for rendering inoperative the latches of the plungers not to be operated, and means coöperating with said lever for releasing said latches.

31. In a computing machine provided with a plurality of numerical orders and arranged to print items and to accumulate and print totals thereof, means for printing said items and totals comprising a platen, a series of type for each numerical order, a type carrier for each order, means for actuating said carriers, means coöperating with the mechanism of their respective orders for controlling the actuation of said carriers, an actuating type plunger for each series of type, means for setting said plungers, means for retaining the plungers to be operated in their set position, means for maintaining in inoperative positions the retaining means of the plungers not to be operated, means coöperating with the mechanism actuating said carriers for tripping said retaining means and means for actuating the set plungers when released.

32. In a device of the kind described having means arranged to print individual items and to accumulate and print the total thereof, said means comprising printing mechanism, operating means for the printing mechanism in combination with supplemental mechanism operative at will to permit the device to automatically print ciphers only whenever the printing mechanism is operated.

33. In a device of the kind described, means for printing individual items and accumulating and printing the total thereof, a plurality of series of keys, the printing mechanism including the characters from zero to nine inclusive, an intermediate mechanism between said keys and printing mechanism, and operating means for said printing mechanism in combination with means for automatically controlling the printing of ciphers at each operation of the machine to the left of printed characters.

34. In a device of the kind described, having a plurality of numerical orders, a series of keys for each order, printing mechanism for each order, including the characters from zero to nine, intermediate controlling mechanism for said printing mechanism arranged between said printing mechanism and said keys, and means for operating the printing mechanism, in combination with controlling means for each order independent of the keys, coöperating with the cipher printing mechanism of that order, and also with all those to the right thereof, whereby upon operating said controlling means of any order a cipher will be set up in said order, and also in all other orders to the right thereof to any order in which a key has been set up.

35. A device of the kind described, comprising printing mechanism and accumulating mechanism, said printing mechanism arranged to print individual items and the total thereof, and operating means for said mechanism, in combination with supplemental mechanism operable at will, comprising controlling means for each order independent of the keys, coöperating with the cipher printing mechanism of that order, and also with all those to the right thereof, whereby upon operating said controlling means of any order a cipher will be set up in said order, and also in all other orders to the right thereof to any order in which a key has been set up.

36. A computing machine or the like comprising computing and printing mechanism and operating means therefor, said printing mechanism arranged to automatically print the ciphers required when printing a whole number, in combination with supplemental mechanism operable at will, comprising controlling means for each order independent of the keys, coöperating with the cipher printing mechanism in that order and all those to the right thereof, whereby upon operating said controlling means in any order a cipher will be set up in said order, and also in all other orders to the right thereof to any order in which a key has been set up.

37. In a device of the kind described, having a plurality of numerical orders, a series of keys for each order, accumulating mechanism, printing mechanism, for printing individual items or totals, and intermediate controlling mechanism in combination with controlling means for each order independent of the keys, coöperatively connected with the cipher printing mechanism of that order, and with all orders to the right thereof, whereby upon operating said controlling means of any order a cipher will be set up in said order, and also in all other orders to the right thereof to any order in which a key has been set up.

38. A computing machine provided with a plurality of numerical orders, item and total indicators and a series of operating keys therefor for each order, intermediate transmitting mechanism for each series between said keys and said indicators, each comprising a bell crank connected with the keys at one arm and pivotally carrying a lever on the opposite arm, said lever provided with a gear segment thereon, a bell crank pivotally connected with said first bell crank and provided with a gear segment in mesh with the gear segment on said lever, a limiting member coöperating with the keys and secured to the other arm of said last mentioned bell crank, a pivotally supported arm connected with the lever on said bell crank, connecting means between said pivotally supported arm and said item indicator, a rotatable ratchet wheel, a pawl therefor carried by said pivotally supported arm, a gear, transmitting mechanism between said ratchet and gear and transmitting mechanism between said gear and the total indicator, the transmitting mechanism between said ratchet and gear comprising a pinion secured to said ratchet and a pinion secured to said gear, idler pinions arranged between said first mentioned pinions and a support for said idler pinions, said support provided with a gear, and a pinion meshing with the said support gear and connected with the operating mechanism of the adjacent lower order.

39. A computing machine or the like, comprising a series of registering wheels, and a series of operating keys therefor, intermediate transmitting mechanism between said keys and said registering wheels, whereby the movement of the keys is transmitted to the wheels, said transmitting mechanism comprising a driven member, a driving member and a limiting member coöperating with the keys to advance said indicators a distance predetermined by the value of the key operated.

40. In a device of the kind described for printing individual items and accumulating and printing the total thereof, type carriers, a series of type for each carrier, and means for actuating the same, comprising a plurality of spring actuated plungers, means for controlling said plungers, comprising a rock shaft, and means for operating the same, a plurality of cams secured on said shaft, a bell-crank, one arm of said crank arranged to coöperate with said cams and the other arm provided with means for engaging and retracting said plungers and their actuated springs, a plurality of latches for maintaining said plungers in retracted positions, controlling members engaging said latches and coöperating with said type carriers, means for normally operating said latches comprising connecting means between said latches and shaft arranged to lower the same to engage said plungers, means for thereafter operating said latches to release said plungers, in combination with controlling means for each order independent of the keys, coöperating with the cipher printing mechanism of that order and of all orders to the right thereof, whereby upon operating said controlling means of any order a cipher will be set up in said order, and also in all others to the right thereof to any order in which a key has been set up.

In testimony whereof, I have hereunto signed my name in the presence of two subscribing witnesses.

DANIEL W. SHIEK.

Witnesses:
  ROY W. HILL,
  CHARLES I. COBB.